United States Patent
Repp et al.

[11] Patent Number: 5,791,684
[45] Date of Patent: Aug. 11, 1998

[54] AIRBAG REACTION CANISTER WITH COLLAPSIBLE SIDE WALL

[75] Inventors: James H. Repp, Monroe, Mich.; Daniel L. Steimke, Ogden, Utah; John G. Bauer, Troy, Mich.

[73] Assignees: Morton International, Inc., Chicago, Ill.; Chrysler Corporation, Auburn Hills, Mich.

[21] Appl. No.: 691,890

[22] Filed: Aug. 1, 1996

[51] Int. Cl.$^6$ ................................................ B60R 21/16
[52] U.S. Cl. ................................................ 280/732
[58] Field of Search .................... 280/728.2, 728.3, 280/732, 750, 751, 752; 188/371

[56] References Cited

U.S. PATENT DOCUMENTS

| | | | |
|---|---|---|---|
| 3,373,630 | 3/1968 | Heurtebise | 188/371 |
| 3,492,888 | 2/1970 | Nishimura et al. | 188/371 |
| 4,941,678 | 7/1990 | Lauritzen et al. | 280/732 |
| 5,342,082 | 8/1994 | Kriska et al. | 280/728 A |
| 5,395,133 | 3/1995 | Lauritzen et al. | 280/732 |
| 5,405,163 | 4/1995 | Amamori et al. | 280/728.2 |
| 5,505,484 | 4/1996 | Miles et al. | 280/728.2 |
| 5,533,747 | 7/1996 | Rose | 280/732 |
| 5,566,975 | 10/1996 | Stull et al. | 280/732 |

FOREIGN PATENT DOCUMENTS

| | | | |
|---|---|---|---|
| 6-55987 | 3/1994 | Japan | 280/732 |
| 2265337 | 9/1993 | United Kingdom | 280/732 |

OTHER PUBLICATIONS

Abstract of JP 02 306846 Dec. 1990.
Abstract of JP 06 293244 Oct. 1994.

*Primary Examiner*—Paul N. Dickson
*Attorney, Agent, or Firm*—George W. Rauchfuss, Jr.

[57] ABSTRACT

The reaction canister of a passenger-side motor vehicle airbag module is extruded with a groove in at least one side wall forming a thinned section running the length of the canister. This creates a weakened and bendable region which allows the side wall to buckle under an impact through the instrument panel of the vehicle. This buckling absorbs impact energy, avoiding or reducing injury to the occupant.

8 Claims, 1 Drawing Sheet

AIRBAG REACTION CANISTER WITH COLLAPSIBLE SIDE WALL

TECHNICAL FIELD

This invention relates to automotive airbag modules. More specifically, it relates to a passenger-side airbag reaction canister designed to minimize head impact injuries in crashes of severity less than required to cause airbag deployment.

BACKGROUND ART

Federal Motor Vehicle Safety Standard No. 201 (FMVSS 201) sets forth requirements for minimizing head impact injuries occurring during crashes of severity less than required for airbag deployment. The need for such a standard arises from the fact that the airbag reaction canister in a passenger-side airbag installation is mounted closely adjacent and behind the breakaway portion of an automotive instrument panel. This portion of the instrument panel is customarily a resilient plastic. Accordingly, in the case of a sudden stop at a speed lower than required for airbag deployment, it is possible for the passenger's head to contact the edge of the reaction canister mouth through the resilient instrument panel, thereby causing injury.

In order to solve the problem addressed by FMVSS 201, various means have been employed to weaken or render less rigid the reaction canister side walls. These include, for example, introducing corrugations into the side wall, punching perforations into the side wall, or employing multi-piece reaction canisters wherein the side wall is constructed of two interlocking portions. These approaches add to the cost and complexity of the reaction canister and some can create problems, such as rattles or tearing of the airbag cushion. Accordingly it is a primary object of the present invention to provide a reaction canister having at least, one side wall which is weak, ab initio, in a preselected region to absorb the energy of head impacts. Another object is to provide such a canister wherein the weakened portion is formed during extrusion of the canister such that no subsequent operations are required. Other objects, features, and advantages will become apparent from the following description and appended claims.

DISCLOSURE OF INVENTION

This invention comprises an extruded reaction canister for a passenger-side airbag module. It may be of any extrudable material, such as plastic or aluminum. During extrusion, one or more grooves are provided in at least one of the reaction canister side walls which is subject to a head impact. This provides a thinned section in the side wall which is bendable under an impact to the edge of the side wall.

BEST MODE FOR CARRYING OUT THE INVENTION

Figure 1:
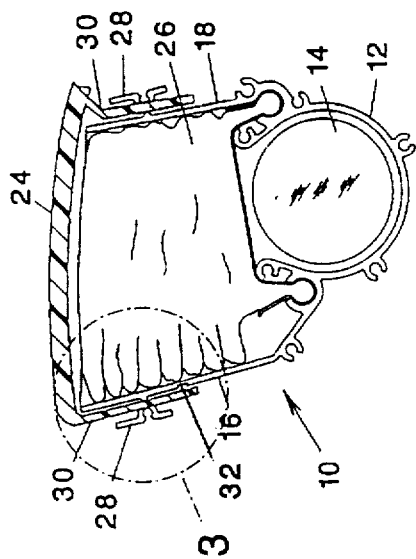
FIG. 1 is an elevational view of a reaction canister in accordance with the present invention.
Figure 2:
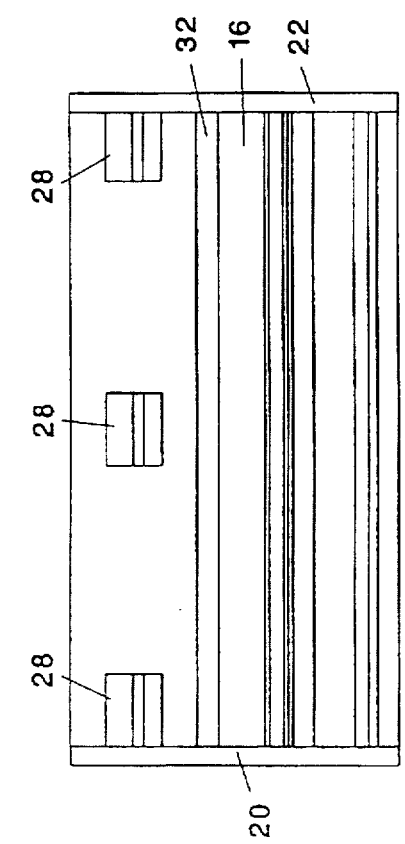
FIG. 2 is a right end view of the canister of FIG. 1 with the right side end plate removed and illustrating the breakaway portion of the instrument panel.

FIGS. 1 and 2 illustrate a passenger-side airbag module which includes an extruded reaction canister 10. The canister 10 is of basically standard construction which may include, for example, a substantially cylindrical housing 12 for containing an inflator 14 and a pair of spaced side walls 16, 18 substantially in the form of a trough. The ends of the reaction canister are closed by a left end plate 20 and a right end plate 22. (Terms such as "left," "right," "up," and "down" are relative to the drawing and not to the position of the module in a vehicle.) Thus it will be seen that the upper edges 34 (FIG. 3) of the side walls 16, 18 and the end plates 20, 22 define a rectangular open mouth which may be positioned closely behind the breakaway door 24 which forms a portion of the instrument panel.

A folded airbag 26 is housed within the reaction canister. When the airbag 26 is inflated, it breaks open the door 24 to deploy within the passenger compartment. In the illustrated embodiment, each side wall of the reaction canister includes a plurality of T sections 28. The T sections are designed to engage depending legs 30 of the door 24. However, they do not constitute part of the invention and other constructions may be employed.

Figure 3:
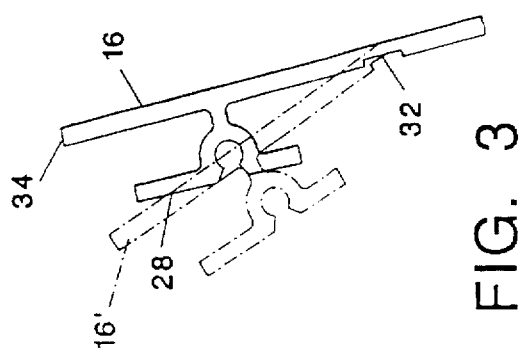
FIG. 3 is an enlarged representation of encircled region 3 of FIG. 2 with the instrument panel door attachment leg removed.

The main body of the reaction canister, comprising the housing 12 and the side walls 16, 18, is extruded and the extrusion is cut to the desired length. In one specific embodiment, for example, the reaction canister material is aluminum 6063-T6 and the thickness of the side walls is 2.29 mm. In the illustrated embodiment it is assumed that the side wall 16 has an upper edge which defines the mouth of the reaction canister and which is also subject to head impact. Accordingly, the reaction canister is extruded with a groove 32 on the outer surface of side wall 16 which runs the length of the reaction canister. Preferably, this groove is positioned below the T sections 28 which anchor the door. In the embodiment of FIGS. 1–3, the groove 32 is substantially rectangular. In the specific embodiment referred to above, the groove 32 was 6 mm in width and 0.79 mm deep, leaving a thinned section of the side wall 1.50 mm thick. The overall length of the side wall was 248 mm. As illustrated in phantom in FIG. 3, a blow to the upper edge 34 of the side wall 16 causes the side wall to buckle and bend along the groove 32 to 16', thereby absorbing the energy of the impact to avoid or reduce injury.

Figure 4:
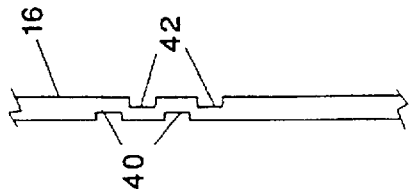
FIG. 4 is a modified version of the groove employed in the invention.
Figure 5:
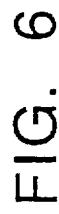
FIG. 5 is a further modification of the groove of FIG. 4.
Figure 6:
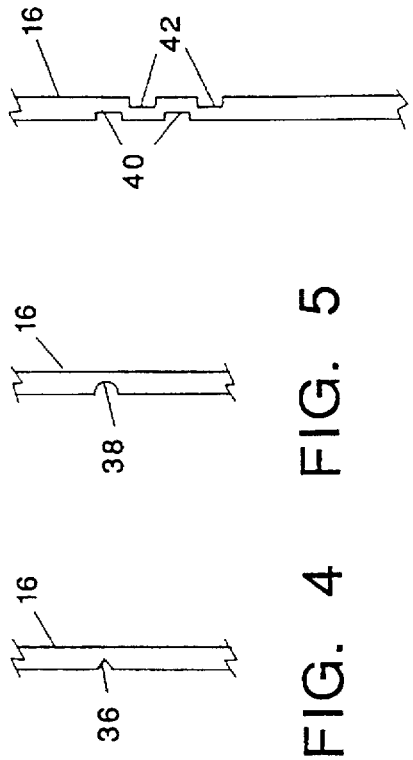
FIG. 6 is a still further modification of the groove of the invention.

It will be apparent that other variations may be employed to produce a thinned and bendable section in the side wall. FIG. 4 illustrates a groove 36 of triangular cross-section. FIG. 5 illustrates a groove 38 of semi-circular cross-section. It will also be apparent that the grooves may be employed on either the outer or inner surfaces of the side wall 16. In FIG. 6, for example, a pair of spaced parallel grooves 40 are formed on the outer surface of the side wall 16 and a pair of interjacent parallel grooves 42 are formed on the inner surface of the side wall 16 to thereby provide a corrugated effect.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. In an automotive airbag module of the type including an extruded reaction canister in the form of a trough having first and second side walls for retaining a folded airbag therebetween, each of said side walls having an inner and an outer surface, first and second ends, and an edge defining one side of an open mouth positionable behind a breakaway portion of an automotive instrument panel, the improvement which comprises:

an extruded groove in at least one of said side walls extending from the first end to the second end of said side wall and forming a thinned section bendable under an impact to the edge of said side wall.

2. The improvement of claim 1 wherein said groove is a rectangular, triangular or semi-circular extruded groove.

3. The improvement of claim 1 wherein said side wall and reaction canister are extruded as an integral unit.

4. The improvement of claim 1 wherein said one side wall has a plurality of substantially parallel grooves in said side wall.

5. The improvement of claim 4 wherein said grooves are in both of said inner and outer surfaces of said side wall.

6. The improvement of claim 5 wherein at least one groove in said outer surface is closely adjacent at least one groove in said inner surface.

7. The improvement of claim 6 wherein said one side wall is extruded with said grooves therein.

8. The improvement of claim 7 wherein said side wall and reaction canister are extruded as an integral unit.

* * * * *